United States Patent
Das et al.

(10) Patent No.: US 7,739,263 B2
(45) Date of Patent: Jun. 15, 2010

(54) GLOBAL HINTS

(75) Inventors: Dinesh Das, Redwood City, CA (US); Benoit Dageville, Foster City, CA (US); Mohamed Ziauddin, Pleasanton, CA (US); Mohamed Zait, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 335 days.

(21) Appl. No.: 10/936,781

(22) Filed: Sep. 7, 2004

(65) Prior Publication Data

US 2005/0125398 A1 Jun. 9, 2005

Related U.S. Application Data

(60) Provisional application No. 60/500,490, filed on Sep. 6, 2003.

(51) Int. Cl.
*G06F 17/30* (2006.01)
(52) U.S. Cl. ....................................................... 707/713
(58) Field of Classification Search ....................... 707/2
See application file for complete search history.

(56) References Cited

U.S. PATENT DOCUMENTS

| | | | |
|---|---|---|---|
| 5,140,685 A | 8/1992 | Sipple et al. |
| 5,260,697 A | 11/1993 | Barrett et al. |
| 5,398,183 A | 3/1995 | Elliott |
| 5,408,653 A | 4/1995 | Josten et al. |
| 5,481,712 A | 1/1996 | Silver et al. |
| 5,504,917 A | 4/1996 | Austin |
| 5,544,355 A | 8/1996 | Chaudhuri et al. |
| 5,577,240 A | 11/1996 | Demers et al. |
| 5,634,134 A | 5/1997 | Kumai et al. |
| 5,724,569 A | 3/1998 | Andres |
| 5,737,601 A | 4/1998 | Jain et al. |
| 5,761,660 A | 6/1998 | Josten et al. |
| 5,765,159 A * | 6/1998 | Srinivasan .................. 707/102 |
| 5,781,912 A | 7/1998 | Demers et al. |
| 5,794,227 A | 8/1998 | Brown |
| 5,794,229 A | 8/1998 | French et al. |
| 5,806,076 A | 9/1998 | Ngai et al. |
| 5,860,069 A | 1/1999 | Wright |
| 5,870,760 A | 2/1999 | Demers et al. |
| 5,870,761 A | 2/1999 | Demers et al. |
| 5,940,826 A | 8/1999 | Heideman et al. |
| 5,963,933 A | 10/1999 | Cheng et al. |
| 5,963,934 A | 10/1999 | Cochrane et al. |
| 5,991,765 A | 11/1999 | Vethe |

(Continued)

OTHER PUBLICATIONS

Aboulnaga, A. et al. "Self-tuning Histograms: Building Histograms Without Looking at Data", Proceedings of the 1999 ACM SIGMOD International Conference on Management of Data, SIGMOD'99, Philadelphia, PA, 1999, pp. 181-192.

(Continued)

*Primary Examiner*—John R. Cottingham
*Assistant Examiner*—Kimberly Lovel
(74) *Attorney, Agent, or Firm*—Vista IP Law Group, LLP.

(57) ABSTRACT

A method for determining a name for a query block of a database query language statement, and associating one or more tuning hints with the query block using the name.

25 Claims, 4 Drawing Sheets

U.S. PATENT DOCUMENTS

| | | |
|---|---|---|
| 6,052,694 A | 4/2000 | Bromberg |
| 6,122,640 A | 9/2000 | Pereira |
| 6,195,653 B1 | 2/2001 | Bleizeffer et al. |
| 6,212,514 B1 | 4/2001 | Eberhard et al. |
| 6,275,818 B1 | 8/2001 | Subramanian et al. |
| 6,321,218 B1 | 11/2001 | Guay et al. |
| 6,330,552 B1 | 12/2001 | Farrar et al. |
| 6,349,310 B1 | 2/2002 | Klein et al. |
| 6,353,818 B1 | 3/2002 | Carino, Jr. |
| 6,356,889 B1 | 3/2002 | Lohman et al. |
| 6,366,901 B1 | 4/2002 | Ellis |
| 6,366,903 B1 | 4/2002 | Agrawal et al. |
| 6,374,257 B1 | 4/2002 | Guay et al. |
| 6,397,207 B1 | 5/2002 | Bleizeffer et al. |
| 6,397,227 B1 | 5/2002 | Klein et al. |
| 6,434,545 B1 | 8/2002 | MacLeod et al. |
| 6,434,568 B1 | 8/2002 | Bowman-Amuah |
| 6,442,748 B1 | 8/2002 | Bowman-Amuah |
| 6,460,027 B1 | 10/2002 | Cochrane et al. |
| 6,460,043 B1 | 10/2002 | Tabbara et al. |
| 6,493,701 B2 | 12/2002 | Ponnekanti |
| 6,496,850 B1 | 12/2002 | Bowman-Amuah |
| 6,513,029 B1 | 1/2003 | Agrawal et al. |
| 6,529,901 B1 | 3/2003 | Chaudhuri et al. |
| 6,560,606 B1 | 5/2003 | Young |
| 6,571,233 B2 | 5/2003 | Beavin et al. |
| 6,594,653 B2 * | 7/2003 | Colby et al. ............... 707/3 |
| 6,598,038 B1 | 7/2003 | Guay et al. |
| 6,615,223 B1 | 9/2003 | Shih et al. |
| 6,701,345 B1 | 3/2004 | Carley et al. |
| 6,714,943 B1 | 3/2004 | Ganesh et al. |
| 6,721,724 B1 | 4/2004 | Galindo-Legaria et al. |
| 6,728,719 B1 | 4/2004 | Ganesh et al. |
| 6,728,720 B1 | 4/2004 | Lenzie |
| 6,744,449 B2 | 6/2004 | MacLeod et al. |
| 6,763,353 B2 | 7/2004 | Li et al. |
| 6,804,672 B1 | 10/2004 | Klein et al. |
| 6,816,874 B1 | 11/2004 | Cotner et al. |
| 6,839,713 B1 | 1/2005 | Shi et al. |
| 6,850,925 B2 | 2/2005 | Chaudhuri et al. |
| 6,865,567 B1 | 3/2005 | Oommen et al. |
| 6,910,109 B2 | 6/2005 | Holman et al. |
| 6,912,547 B2 | 6/2005 | Chaudhuri et al. |
| 6,915,290 B2 | 7/2005 | Bestgen et al. |
| 6,931,389 B1 | 8/2005 | Bleizeffer et al. |
| 6,934,701 B1 | 8/2005 | Hall, Jr. |
| 6,947,927 B2 | 9/2005 | Chaudhuri et al. |
| 6,961,931 B2 | 11/2005 | Fischer |
| 6,999,958 B2 | 2/2006 | Carlson et al. |
| 7,007,013 B2 | 2/2006 | Davis et al. |
| 7,031,958 B2 | 4/2006 | Santosuosso |
| 7,047,231 B2 | 5/2006 | Grasshoff et al. |
| 7,058,622 B1 | 6/2006 | Tedesco |
| 7,080,062 B1 | 7/2006 | Leung et al. |
| 7,139,749 B2 | 11/2006 | Bossman et al. |
| 7,146,363 B2 | 12/2006 | Waas et al. |
| 7,155,426 B2 | 12/2006 | Al-Azzawe |
| 7,155,459 B2 | 12/2006 | Chaudhuri et al. |
| 7,272,589 B1 | 9/2007 | Guay et al. |
| 7,302,422 B2 | 11/2007 | Bossman et al. |
| 7,353,219 B2 | 4/2008 | Markl et al. |
| 2002/0073086 A1 | 6/2002 | Thompson et al. |
| 2002/0120617 A1 | 8/2002 | Yoshiyama et al. |
| 2002/0198867 A1 | 12/2002 | Lohman et al. |
| 2003/0018618 A1 | 1/2003 | Bestgen et al. |
| 2003/0065648 A1 | 4/2003 | Driesch et al. |
| 2003/0088541 A1 | 5/2003 | Zilio et al. |
| 2003/0093408 A1 * | 5/2003 | Brown et al. ............... 707/2 |
| 2003/0110153 A1 | 6/2003 | Shee |
| 2003/0115183 A1 | 6/2003 | Abdo et al. |
| 2003/0126143 A1 | 7/2003 | Roussopoulos et al. |
| 2003/0130985 A1 | 7/2003 | Driesen et al. |
| 2003/0135478 A1 | 7/2003 | Marshall et al. |
| 2003/0154216 A1 | 8/2003 | Arnold et al. |
| 2003/0177137 A1 | 9/2003 | MacLeod et al. |
| 2003/0182276 A1 * | 9/2003 | Bossman et al. ............... 707/3 |
| 2003/0187831 A1 | 10/2003 | Bestgen et al. |
| 2003/0200204 A1 | 10/2003 | Limoges et al. |
| 2003/0200537 A1 | 10/2003 | Barsness et al. |
| 2003/0229621 A1 | 12/2003 | Carlson et al. |
| 2003/0229639 A1 | 12/2003 | Carlson et al. |
| 2004/0002957 A1 | 1/2004 | Chaudhuri et al. |
| 2004/0003004 A1 | 1/2004 | Chaudhuri et al. |
| 2004/0019587 A1 * | 1/2004 | Fuh et al. ............... 707/2 |
| 2004/0034643 A1 | 2/2004 | Bonner et al. |
| 2004/0181521 A1 | 9/2004 | Simmen et al. |
| 2004/0210563 A1 | 10/2004 | Zait et al. |
| 2004/0215626 A1 | 10/2004 | Colossi et al. |
| 2005/0033734 A1 | 2/2005 | Chess et al. |
| 2005/0097078 A1 | 5/2005 | Lohman et al. |
| 2005/0097091 A1 | 5/2005 | Ramacher et al. |
| 2005/0102305 A1 | 5/2005 | Chaudhuri et al. |
| 2005/0119999 A1 | 6/2005 | Zait et al. |
| 2005/0120000 A1 | 6/2005 | Ziauddin et al. |
| 2005/0120001 A1 | 6/2005 | Yagoub et al. |
| 2005/0125393 A1 | 6/2005 | Yagoub et al. |
| 2005/0125398 A1 | 6/2005 | Das et al. |
| 2005/0125427 A1 | 6/2005 | Dageville et al. |
| 2005/0125452 A1 | 6/2005 | Ziauddin et al. |
| 2005/0138015 A1 | 6/2005 | Dageville et al. |
| 2005/0177557 A1 | 8/2005 | Ziauddin et al. |
| 2005/0187917 A1 | 8/2005 | Lawande et al. |
| 2005/0251523 A1 | 11/2005 | Rajamani et al. |
| 2006/0004828 A1 | 1/2006 | Rajamani et al. |
| 2006/0167883 A1 | 7/2006 | Boukobza |
| 2007/0038618 A1 | 2/2007 | Kosciusko et al. |

OTHER PUBLICATIONS

Almeida, et al., "Panasync: Dependency tracking among file copies", Proceedings of the 9th Workshop on ACM SIGOPS European Workshop: Beyond the PC: New Challenges for the Operating System, Kolding, Denmark, 2000, pp. 7-12.

Baldoni, et al., "A Communication-Induced Checkpointing Protocol that Ensures Rollback-Dependency Trackability", 27th Annual International Symposium on Fault-Tolerant Computing, FTCS-27, IEEE, 1997, pp. 68-77.

Baldoni, et al., "Rollback-Dependency Trackability: Visible Characterizations", Proceedings of the 18th Annual ACM Symposium on Principles of Distributed Computing, Atlanta, GA, 1999, pp. 33-42.

Damani, et al, "Optimistic Distributed Simulation Based on Transitive Dependency Tracking", Proceedings of the 11th Workshop on Parellel and Distributed Simulation, IEEE, 1997, pp. 90-97.

Elnozahy, "On the Relevance of Communication Costs of Rollback-Recovery Protocols", Proceedings of the 14th Annual ACM Symposium on Principles of Distributed Computing, Ottawa, Ontario, Canada, 1995, pp. 74-79.

Garcia, et al., "On the Minimal Characterization of the Rollback-Dependency Trackability Property", 21st International Conference on Distributed Computing Systems, IEEE, Apr. 16-19, 2001, pp. 342-349.

Graefe, G. "Dynamic Query Evaluation Plans: Some Course Corrections?", Bulletin of the IEEE Computer Society Technical Committee on Data Engineering, Jun. 2000, vol. 23, No. 2, pp. 3-6.

Hellerstein, J.M. et al. "Adaptive Query Processing: Technology in Evolution", Bulletin of the IEEE Computer Society Technical Committee on Data Engineering, Jun. 2000, vol. 23, No. 2, pp. 7-18.

Kabra, N. et al. "Efficient Mid-Query Re-Optimization of Sub-Optimal Query Execution Plans", Proceedings of the 1998 ACM SIGMOD International Conference on Management of Data, SIGMOD'98, Seattle, WA, 1998, pp. 106-117.

Louboutin, et al., "Comprehensive Distributed Garbage Collection by Tracking Causal Dependencies of Relevant Mutator Events", Proceedings of the 17th International Conference on Distributed Computing Systems, IEEE, May 27-30, 1997, pp. 516-525.
Perry, "Consumer Electronics", IEEE Spectrum, Jan. 1997, vol. 34, No. 1, pp. 43-48.
Sadri, "Integrity Constraints in the Information Source Tracking Method", IEEE Transactions on Knowledge and Data, Feb. 1995, vol. 7, Issue 1, pp. 106-119.
Sreenivas, et al., "Independent Global Snapshots in Large Distributed Systems", Proceedings of the 4th International Conference on High Performance Computing, IEEE, Dec. 18-21, 1997, pp. 462-467.
Avnur, R. et al. "Eddies: Continuously Adaptive Query Processing" Proceedings of the 2000 ACM SIGMOD International Conference on Management of Data (SIGMOD '00), Dallas, TX, May 15-18, 2000, pp. 261-272.
Blakeley, J.A. et al. "Experiences Building the Open OODB Query Optimizer" Proceedings of the 1993 ACM SIGMOD International Conference on Management of Data (SIGMOD '93), Washington, DC, May 25-28, 1993, pp. 287-296.
Bruno, N. et al. "STHoles: A Multidimensional Workload-Aware Histogram" Proceedings of the 2001 ACM SIGMOD International Conference on Management of Data (SIGMOD '01), Santa Barbara, CA, May 21-24, 2001, pp. 211-222.
Bruno, N. et al. "Exploiting Statistics on Query Expressions for Optimization" Proceedings of the 2002 ACM SIGMOD International Conference on Data Management (SIGMOD '02), Madison, WI, Jun. 4-6, 2002, pp. 263-274.
Chaudhuri, S. "An Overview of Query Optimization in Relational Systems" Proceedings of the ACM SIGACT-SIGMOD-SIGART Symposium on Principles of Database Systems (PODS '98), Seattle, WA, Jun. 1-4, 1998, pp. 34-43.
Chaudhuri, S. et al. "Rethinking Database System Architecture: Towards a Self-Tuning RISC-style Database System" Proceedings of the 26th International Conference on Very Large Databases (VLDB 2000), Cairo, Egypt, Sep. 10-14, 2000, pp. 1-10.
Chen, C.M. et al. "Adaptive Selectivity Estimation Using Query Feedback" Proceedings of the 1994 ACM SIGMOD International Conference on Management of Data (SIGMOD '94), Minneapolis, MN, May 24-27, 1994, pp. 161-172.
Derr, M.A. "Adaptive Query Optimization in a Deductive Database System" Proceedings of the 2nd International Conference on Information and Knowledge Management (CIKM '93), Washington, DC, Nov. 1-5, 1993, pp. 206-215.
Ganek, A.G. et al. "The dawning of the autonomic computing era" IBM Systems Journal, 2003, vol. 42, No. 1, pp. 5-18.
Gassner, P. et al. "Query Optimization in the IBM DB2 Family" Data Engineering, Dec. 1993, vol. 16, No. 4, pp. 4-18.
Getoor, L. et al. "Selectivity Estimation using Probabilistic Models" Proceedings of the 2001 ACM SIGMOD International Conference on Management of Data (SIGMOD '01), Santa Barbara, CA, May 21-24, 2001, pp. 461-472.
Gorman, T. "The Search for Intelligent Life in the Cost-Based Optimizer" Jul. 2001, v1.0, pp. 1-11.
IBM "DB2 Universal Database Slashes Administration Costs by Reducing Time Spent on Administrative Tasks by up to 65 Percent" MarketWire, Sep. 9, 2004, pp. 1-3, located at http://www.marketwire.com/mw/release_html-b1?release_id=72387.
Ives, Z.G. et al. "An Adaptive Query Execution System for Data Integration" Proceedings of the 1999 ACM SIGMOD International Conference on Management of Data (SIGMOD '99), Philadelphia, PA, Jun. 1-3, 1999, pp. 299-310.
Lightstone, S.S. et al. "Toward Autonomic Computing with DB2 Universal Database" ACM SIGMOD Record, Sep. 2002, vol. 31, No. 3, pp. 55-61.
Markl, V. et al. "LEO: An autonomic query optimizer for DB2" IBM Systems Journal, 2003, vol. 42, No. 1, pp. 98-106.
Scheuermann, P. et al. "Adaptive Algorithms for Join Processing in Distributed Database Systems" Distributed and Parallel Databases, 1997, vol. 5, pp. 233-269.
Slivinskas, G. et al. "Adaptable Query Optimization and Evaluation in Temporal Middleware" Proceedings of the 2001 ACM SIGMOD International Conference on Management of Data (SIGMOD '01), Santa Barbara, CA, May 21-24, 2001, pp. 127-138.

Valentin, G. et al. "DB2 Advisor: An Optimizer Smart Enough to Recommend Its Own Indexes" Proceedings of the 16th International Conference on Data Engineering, Feb. 29-Mar. 3, 2000, pp. 101-110.
Zilio, D. et al. "Self-Managing Technology in IBM DB2 Universal Database8" Proceedings of the 10th International Conference on Information and Knowledge Management (CIKM '01), Atlanta, GA, Nov. 5-10, 2001, pp. 541-543.
Office Action dated Apr. 20, 2007 for U.S. Appl. No. 10/936,449.
Office Action dated May 2, 2007 for U.S. Appl. No. 10/935,908.
Office Action dated Apr. 19, 2007 for U.S. Appl. No. 10/936,205.
Office Action dated Sep. 6, 2007 for U.S. Appl. No. 10/936,205.
Office Action dated Feb. 22, 2007 for U.S. Appl. No. 10/936,468.
Office Action dated Aug. 22, 2007 for U.S. Appl. No. 10/936,468.
Office Action dated Jan. 24, 2007 for U.S. Appl. No. 10/936,779.
Office Action dated Aug. 22, 2007 for U.S. Appl. No. 10/936,779.
Office Action dated May 1, 2007 for U.S. Appl. No. 10/936,426.
Office Action dated Sep. 6, 2007 for U.S. Appl. No. 10/936,426.
Office Action dated Jan. 25, 2007 for U.S. Appl. No. 10/936,778.
Ioannidis et al, "Parametric Query Optimization", Proceedings of the 18 VLDB Conference, Vancouver, BC, Canada 1992, pp. 103-114.
Office Action dated Jan. 25, 2007 for U.S. Appl. No. 10/935,906.
Office Action dated Aug. 9, 2007 for U.S. Appl. No. 10/935,906.
Office Action dated Mar. 9, 2007 for U.S. Appl. No. 10/936,469.
Office Action dated Oct. 17, 2007 for U.S. Appl. No. 10/936,469.
Office Action dated Jan. 26, 2007 for U.S. Appl. No. 10/936,427.
Office Action dated Aug. 22, 2007 for U.S. Appl. No. 10/936,427.
Office Action dated Nov. 25, 2008 for U.S. Appl. No. 10/935,906.
Office Action dated Apr. 9, 2008 for U.S. Appl. No. 10/935,906.
Office Action dated Oct. 31, 2008 for U.S. Appl. No. 10/936,779.
Office Action dated May 13, 2008 for U.S. Appl. No. 10/936,779.
Office Action dated Dec. 15, 2008 for U.S. Appl. No. 10/936,426.
Office Action dated Sep. 23, 2008 for U.S. Appl. No. 10/936,426.
Office Action dated Mar. 20, 2008 for U.S. Appl. No. 10/936,426.
Office Action dated Oct. 16, 2008 for U.S. Appl. No. 10/936,205.
Office Action dated Mar. 24, 2008 for U.S. Appl. No. 10/936,205.
Office Action dated Oct. 15, 2008 for U.S. Appl. No. 10/936,468.
Office Action dated Mar. 18, 2008 for U.S. Appl. No. 10/936,427.
Office Action dated Apr. 2, 2008 for U.S. Appl. No. 10/936,468.
Office Action dated Sep. 22, 2008 for U.S. Appl. No. 10/936,449.
Office Action dated Oct. 20, 2008 for U.S. Appl. No. 10/935,908.
Office Action dated Jul. 17, 2008 for U.S. Appl. No. 10/935,908.
Office Action dated Apr. 30, 2008 for U.S. Appl. No. 10/935,908.
Office Action dated Dec. 29, 2008 for U.S. Appl. No. 10/936,468.
Office Action dated Dec. 11, 2008 for U.S. Appl. No. 10/936,469.
Office Action dated May 29, 2008 for U.S. Appl. No. 10/936,469.
Office Action dated Oct. 8, 2008 for U.S. Appl. No. 10/936,778.
Office Action dated Jul. 24, 2008 for U.S. Appl. No. 10/936,778.
Office Action dated Jan. 22, 2009 for U.S. Appl. No. 10/936,778.
Markl et al. "Learning Table Access Cardinalities with LEO" SIGMOD '02, Jun. 3-6, 2002, p. 613.
Stillger et al. "LEO—DB2's Learning Optimizer" VLDB 2001.
Office Action dated Sep. 6, 2007 for U.S. Appl. No. 10/936,449.
Office Action dated Mar. 28, 2008 for U.S. Appl. No. 10/936,449.
Office Action dated Mar. 4, 2009 for U.S. Appl. No. 10/936,449.
Office Action dated Apr. 3, 2009 for U.S. Appl. No. 10/936,468.
Office Action dated May 11, 2009 for U.S. Appl. No. 10/935,906.
Office Action dated May 12, 2009 for U.S. Appl. No. 10/936,779.
Office Action dated Mar. 31, 2009 for U.S. Appl. No. 10/936,427.
Office Action dated May 28, 2009 for U.S. Appl. No. 10/936,469.
Office Action dated Jul. 2, 2009 for U.S. Appl. No. 10/936,778.
Final Office Action dated Dec. 8, 2009 for U.S. Appl. No. 10/936,779.
Final Office Action dated Nov. 20, 2009 for U.S. Appl. No. 10/935,906.
Notice of Allowance dated Sep. 29, 2009 for U.S. Appl. No. 10/936,205.
Final Rejection dated Nov. 12, 2009 for U.S. Appl. No. 10/936,468.
Office Action dated Nov. 27, 2009 for U.S. Appl. No. 10/935,908.
Notice of Allowance dated Sep. 23, 2009 for U.S. Appl. No. 10/936,449.
Notice of Allowance dated Feb. 4, 2010 for U.S. Appl. No. 10/936,778.
Notice of Allowance dated Apr. 19, 2010 for U.S. Appl. No. 10/935,908.

* cited by examiner

GLOBAL HINTS

CROSS-REFERENCE TO RELATED APPLICATIONS

This application claims the benefit of U.S. Provisional Application No. 60/500,490, filed Sep. 6, 2003, which is incorporated herein by reference in its entirety. This application is related to co-pending applications "SQL TUNING SETS," application Ser. No. 10/936,449; "AUTO-TUNING SQL STATEMENTS," application Ser. No. 10/935,908; "SQL PROFILE," application Ser. No. 10/936,205; "SQL TUNING BASE," application Ser. No. 10/936,468; "AUTOMATIC LEARNING OPTIMIZER," application Ser. No. 10/935,906; "AUTOMATIC PREVENTION OF RUNAWAY QUERY EXECUTION," application Ser. No. 10/936,779; "METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER," application Ser. No. 10/936,469; "SQL STRUCTURE ANALYZER," application Ser. No. 10/936,426; "HIGH-LOAD SQL DRIVEN STATISTICS COLLECTION," application Ser. No. 10/936,427; "AUTOMATIC SQL TUNING ADVISOR," application Ser. No. 10/936,778, all of which are filed Sep. 7, 2004 and are incorporated herein by reference in their entirety.

FIELD OF THE INVENTION

This invention is related to the field of electronic database management.

BACKGROUND

Hints are used as a general mechanism to supply directives to the query optimizer when it compiles a SQL statement that influences the plan generated by the compilation process. For example, hints can direct the optimizer to use a particular access path for a table, a specific join method for a join, or a particular join order for the tables. Hints can also be used to provide accurate object or system statistics, to correct optimizer cardinality or cost estimates, or to specify certain optimizer modes (e.g., set an optimizer mode to ALL_ROWS, which causes the plan, when executed, to fetch all the resulting rows of the query). In fact, the entire execution plan can be specified via hints (e.g. in the form of an outline). Hence, hints are one of the main mechanisms used by a database administrator (DBA) to tune, either manually or automatically, the execution plans produced by the optimizer.

Hints can be broadly classified as single-table hints, multi-table hints, query block hints, or statement hints. Single-table hints, such as INDEX and USE_NL (use a nested loop) for example, provide information for processing one table or view, and multi-table hints contain information that can be applied to several tables. A query block hint, such as STAR_TRANSFORMATION and UNNEST for example, operates on a single query block. A statement hint, such as ALL_ROWS, for example, is applied to the entire SQL statement.

Existing hints have several drawbacks. For example, manual hints created by the DBA have to be specified in the query blocks which are being tuned. This requires actually embedding the hint in the query blocks of the SQL statement. However, most packaged applications do not allow the DBA to access the code for the SQL statement, so the DBA is unable to physically insert the hint into the SQL statement. Furthermore, manually inserting a hint into a SQL statement might improve query performance for a while, but can hinder the performance when the system or object characteristics (e.g., workload, object statistics) change, the database is revised, or the software application program is upgraded.

Another disadvantage to the conventional approach for hints is due to query block transformations. Manual hints can be provided for query blocks that are present in the original SQL statement. However, query blocks are often transformed during the compilation process. The DBA cannot know what a transformed query block will look like. Moreover, even if the DBA knew what the query block would be, since it is dynamically generated during the compilation process, there is no way to physically add the hint inside the transformed query block.

SUMMARY OF THE INVENTION

A method for determining a name for a query block of a database query language statement and associating one or more tuning hints with the query block using the name is disclosed.

DETAILED DESCRIPTION

Overview

The embodiments of the invention are described using the term "SQL", however, the invention is not limited to just this exact database query language, and indeed may be used in conjunction with other database query languages and constructs.

Global hints provide a mechanism to deliver external tuning information to an optimizer that is compiling a SQL statement. Global hints can be created and used manually by a database administrator (DBA) to tune specific SQL statements, or can be automatically created by SQL tuning tools. The global hints can be associated with a specific part of the SQL statement, such as a table or a query block, without being physically located in the query block of the statement itself. For example, the global hints may be stored outside of the targeted object (e.g., the table, query block or SQL statement).

Because the hints are created and stored separately from the SQL statement, they can be dynamically associated with a SQL statement from an external storage location, such as a SQL tuning base (STB), and retrieved by the optimizer from the external storage location when compiling the SQL statement. The SQL tuning base stores SQL profiles, which are a source of external hints. As compared to the conventional notion of embedded hints, which are embedded in the query text, external hints are stored in dictionary tables in the STB and are associated with specific SQL statements.

A global hint associated with a SQL statement may target a query block that is not in the original SQL statement, but rather is created as a result of a query transformation when the SQL statement is compiled. Each query block in a SQL statement has an assigned unique name, so that the global hints can target any query block by specifying the name of the targeted block. Similarly, each table within a query block has a unique alias, which is used by the global hints to target the table. Therefore, the global hints are able to specify which query block, and which tables within the query block, are targeted to receive the tuning information, even if the query blocks are created when the statement is being compiled.

Figure 1:
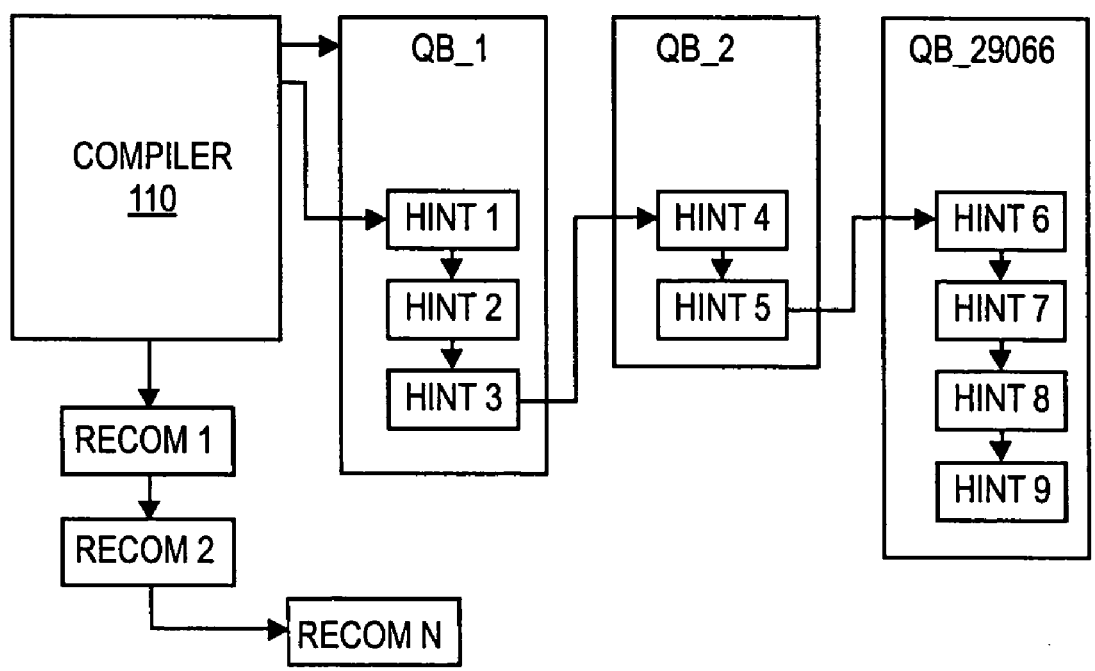
FIG. 1 shows an example of a data structure that associates global hints from a profile with named query blocks for the corresponding SQL statement.

FIG. 1 shows an example of a data structure that associates global hints from a profile with named query blocks for the corresponding SQL statement. The query block named QB_1 is associated with hint 1, hint 2, and hint 3, by compiler 110. The query block QB_2 is associated with hints 4 and 5, and query block QB_29066 is associated with hints 6 through 9. The hints for the statement may also include one or more recommendations for tuning the statement. The global hints can be stored in a profile and retrieved from the profile to be applied to the appropriate query blocks by an optimizer when the statement is compiled.

Figure 2:
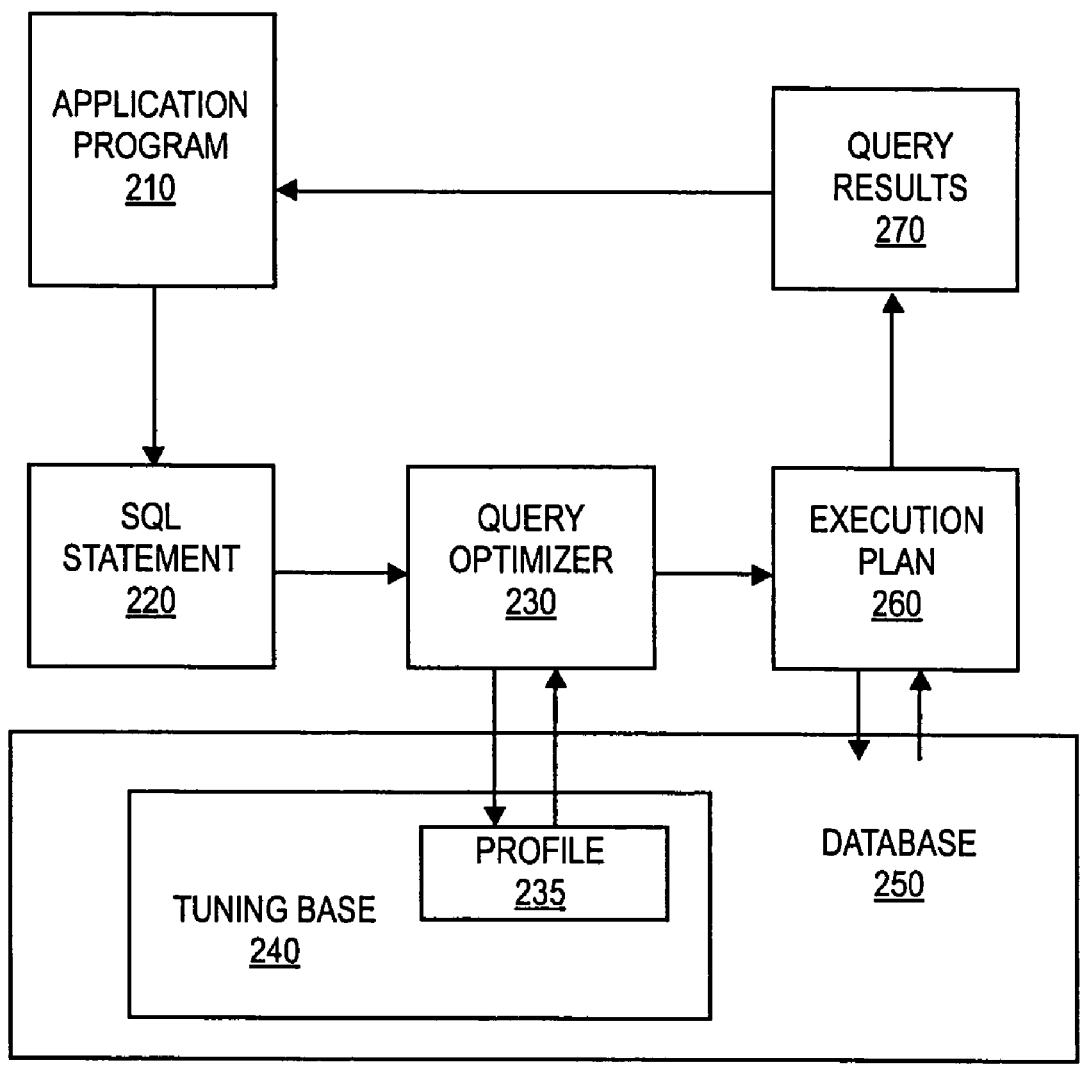
FIG. 2 shows an example of a device that uses the global hints in the profile to tune a SQL statement.

FIG. 2 shows an example of a device that uses the global hints in the profile to tune a SQL statement. The statement 220 is issued by an application program 210 running on a computer processing system. The optimizer 230 retrieves the profile 235 for the statement from tuning base 240 of database 250. Each global hint contains query block name information to allow the optimizer to apply the global hint to the appropriate query block during compilation. An execution plan 260 is then generated with the global hints, and is used to provide query results 270 to the application 210.

Query Block/Table Alias Names

Each query block has a unique name. This applies to query blocks that are present in the original SQL statement, as well as those that are dynamically generated during the compilation process. For example, when a query is issued, it contains one or more query blocks. The execution plan that is generated by the optimizer may contain some of the original query blocks, as well as new query blocks generated by query transformations. For example, a transformation, such as SELECT, FROM, or WHERE, can rewrite a query block. Some transformations are cost based, such as materialized view rewrite and outer join predicate pushdown. Others are not cost-based, such as simple view merging and predicate move-around. Each query block, including the original query blocks, the pre-transformation query blocks, and the post-transformation query blocks, is named. The name can either be user-specified, or generated by the database system. Each unique name, including the name of a transformed query block, is deterministic.

Providing unique and deterministic names for these otherwise anonymous query blocks allows an optimizer to apply information from an external hint to an associated named query block. For example, a transformation may be applied to a query block that pushes an outer join predicate into a view. Suppose that a user wants to provide a hint to the query block during a specific iteration of a cost-based optimization process, such as hinting a certain index only when the predicate is pushed into the view. Using a conventional approach, adding an index hint in the view or with the original query block name will cause the hint to be applied even when the predicate is not pushed into the view. The global hint can be associated with the transformed query block with the predicate that is pushed into the view by using the unique name of the block.

If an external hint is associated with a query block, the hint is provided with the name of the associated block, and can behave as if the hint were embedded in the named query block. Thus, a hint can be turned into a global hint by specifying a name of a query block. For example, the following query returns the first and last name of each employee with the highest salary in his or her department, returns his or her first job, and returns the total salary of the direct reports of that employee:

```
CREATE OR REPLACE VIEW V AS
SELECT
    e1.first_name, e1.last_name, j.job_id, sum(e2.salary) total_sal
FROM employees e1,
    (   SELECT*
        FROM employees e3) e2,
    job_history j
WHERE   e1.employee_id = e2.manager_id
    AND e1.employee_id = j.employee_id
    AND e1.hire_date = j.start_date
    AND e1.salary = ( SELECT
                        max (e2.salary)
                    FROM employees e2
                    WHERE e2.department_id = e1.department_id)
GROUP BY e1.first_name, e1.last_name, j.job_id
ORDER BY total_sal;
SELECT
    *
FROM V;
```

Suppose that the user wants to prevent the sub-query for selecting the employee with the highest salary in the department from being unnested, without changing the view. The name of the sub-query, which is SEL$4 in this example, is used to provide this hint, as shown below:

```
CREATE OR REPLACE VIEW V AS
SELECT
    e1.first_name, e1.last_name, j.job_id, sum(e2.salary) total_sal
FROM employees e1,
    (   SELECT*
        FROM employees e3) e2,
    job_history j
WHERE   e1.employee_id = e2.manager_id
    AND e1.employee_id = j.employee_id
    AND e1.hire_date = j.start_date
    AND e1.salary = ( SELECT
                        max (e2.salary)
                    FROM employees e2
                    WHERE e2.department_id = e1.department_id)
GROUP BY e1.first_name, e1.last_name, j.job_id
ORDER BY total_sal;
SELECT  /*+  NO_UNNEST(@SEL$4)  */
    *
FROM V;
```

Table aliases also are uniquely named. Generally speaking, tables that are present in the query blocks of the original SQL statement already have unique aliases. However, consider the example of view merging. An outer query block may have the same table aliases as tables referenced in views that are contained in the outer query block. If the view is merged into the outer query block, there will be multiple tables with the same aliases, meaning that hints cannot target a table using this name. The solution is to create unique table aliases using the user-specified table alias and the query block where the table was first specified.

For example, consider the following query which returns each employee reporting directly to Adam Fripp. The query has a view with a table having the same alias as the containing query block. Unique object aliases are used to prevent two tables from having the same alias. In this example, the name of the outer query block is SEL$1, the name of the view query block is SEL$2, and the name of the outer query block after the view is merged into it is SEL$F5BB74E1.

```
SELECT  /*+    LEADING (@SEL$F5BB74E1  e@SEL$2)
               USE_MERGE (@SEL$F5BB74E1 e@SEL$2)   */
    V.employee_id, V.first_name, V.last_name
FROM employees e, (SELECT * from employees e) V;
WHERE     e.employee_id = V.manager_id
    AND   e.first_name = 'Adam'
    AND   e.last_name = 'Fripp' ;
```

Naming Method

Original

Query blocks that are present in the original SQL statement are pre-rewrite query blocks, and can be named using a numbering scheme, starting from the outermost query block. For example, a global counter can be used to supply a number that provides a new name each time a query block is parsed or generated. The number of the counter can be incremented after each use. Thus, query blocks in the original SQL statement can be named according to the order in which they are parsed. This provides several advantages. First, since the counter is global, each name that the counter generates is guaranteed to be unique (unless a user also defines query block names). Second, the global counter is simple to implement. Third, since the parse order for query blocks in a query is likely to be predictable and stable over multiple releases, users can obtain the names of query blocks in the original query without analyzing the execution plan.

Transformed

Post-query-transformation (or post-rewrite) query blocks have certain characteristics of these query blocks. For example, the parse order of the post-rewrite query blocks is related to the order of the query transformations. Also, the transformation order of a post-rewrite query block can change during the compilation, due to factors such as cost or revised statistics. A method of naming is used that can allow the hint associated with the query block to be applied to the query block, even if the transformation order changes. Thus, plan stability can be maintained.

Post-rewrite query blocks can be new query blocks generated via query transformations, or can be existing query blocks that have received a cost-based transformation. The post-rewrite query blocks can be named using a hash method. In one embodiment of the naming method, the new query block's name can be a function of the original query block's name, the type of the transformation applied to the query block, and other attributes that uniquely characterize the transformation. For example, if a set of views is merged into an outer query block to create a new query block, the new query block's name can be a function of the name of the old outer query block, the merge transformation, and the names of the view query blocks that were merged into the outer query block. An alternative approach of query block naming is to compute a hash value based on the text of the query block. For pre-rewrite query blocks, this can be performed as parse time, since the text is available. Post-rewrite query blocks where the text is unavailable can be unparsed, then hashed.

Figure 3:
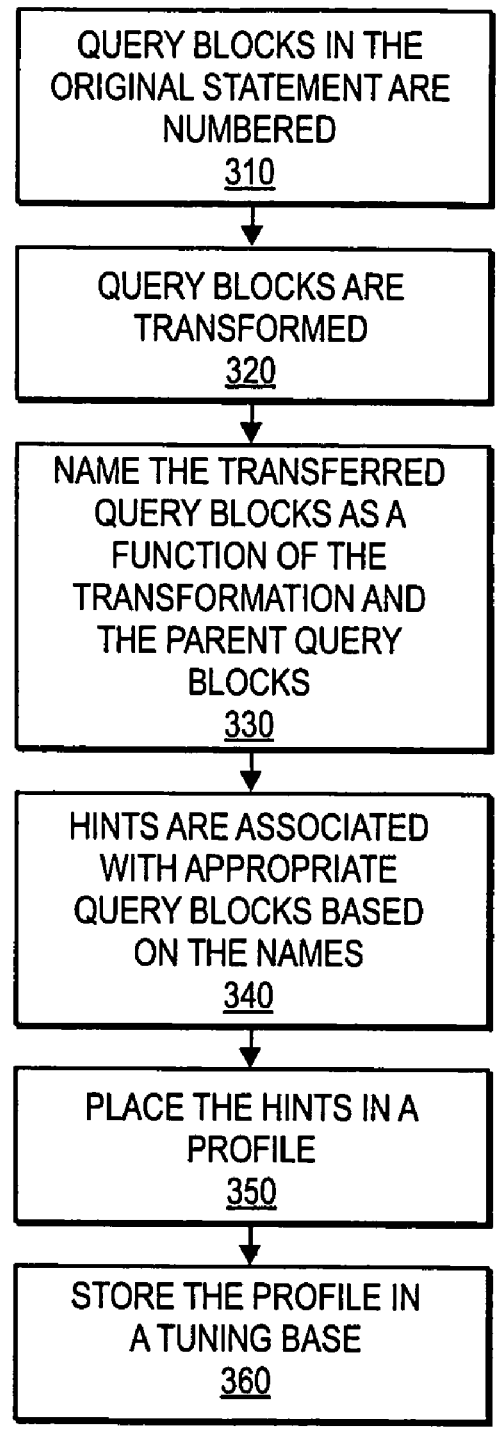
FIG. 3 shows an example of a method of associating global hints with named query blocks to tune a SQL statement.

FIG. 3 shows an example of a method of associating global hints with named query blocks to tune a SQL statement. Query blocks in the original statement are numbered, 310. During compilation of the statement, query blocks are transformed, 320. Each transformed query blocks is named as a function of its parent block or blocks, and the transforming operation, 330. Hints for tuning the statement are associated with appropriate query blocks based on the query block names, 340. Each hint, including information about its corresponding query block, is placed in a profile for the statement, 350, which is stored in a tuning base, 360.

Parsing

Hint parsing and resolution can be performed with global hints. Hint parsing involves converting a user-specified hint into an internal representation to be processed by the optimizer. The internal representation contains global hint information to perform hint resolution based on the query block names. Hint resolution refers to the process of matching each global hint to its target object, as well as addressing conflicts between different global hints. In one embodiment, hint resolution is postponed until the query has been parsed.

A global hint parser converts hints stores global hint information such as the text of an atomic hint, the text of the source hint, the source query block that specifies the hint, and the destination query block to which the hint is applied. The global hint parser converts the global hints into atomic hints. A hint is atomic if it cannot be decomposed into a set of semantically equivalent hints with fewer arguments each than itself. Consider the following example with both atomic and non-atomic hints:

```
SELECT  /*+  INDEX_COMBINE (j jhist_employeeix jhist_job_ix)
             INDEX_COMBINE (j j_ix) */
FROM employees e1,
    (   SELECT
            *
        FROM employees e3) e2,
    job_history j
WHERE   e1.employee_id = e2.manager_id
    AND e1.employee id = j.employee_id
    AND e1.hire_date = j.start_date
    AND e1.salary = ( SELECT
                            max (e2.salary)
                      FROM employees e2
                      WHERE e2.department_id = e1.department_id)
GROUP BY  e1.first_name, e1.last_name, j.job_id
ORDER BY  total_sal;
```

In one embodiment, each parse process that handles table or block hints also generates and stores atomic hints. The information for the atomic hints are stored in a data structure for the global hint. The source text of the global hint is set by the parser and stored in the data structure. The source and destination query blocks are also stored in this data structure. This example, has three atomic hints in this view. The values for each atomic hint and its source are:

| Hint Text | Source Text |
| --- | --- |
| INDEX_COMBINE (j jhist_employeeix) | INDEX_COMBINE (j jhist_employeeix jhist_job_ix) |
| INDEX_COMBINE (j jhist_job_ix) | INDEX_COMBINE (j jhist_employeeix jhist_job_ix) |
| INDEX_COMBINE (j j _ix) | INDEX_COMBINE (j j _ix) |

The source query block of a hint is the query block in which the hint is specified. The destination query block of a hint is the query block to which the hint applies. The destination query block may be different from the source query block for global table or global query block hints. Source query blocks are populated when the query block is named. The destination query blocks may be populated during hint resolution.

Hint Resolution

After the query has been parsed, some atomic hints may be unresolved. The unresolved atomic hints have known source query blocks and conflicts with other hints or unknown destination query blocks. For example, a NO_MERGE hint or a table hint may have information about the target object (the destination query block for the merge hint or the destination table for the table hint), but may conflict with other hints. A global table hint may have an ambiguous destination that depends on whether the named object is a view name or a query block name. Also, hints that have dual roles as table or query block hints, such as a NO_MERGE(X) hint, may have unknown destination query blocks.

Hint resolution is the process of matching each unresolved hint to its target object. The unresolved atomic hints are maintained in a chain in the global hint data structure. The hint parsing processes append atomic hints to this chain. As each hint is resolved, it is removed from this chain. During hint resolution, missing destination query blocks are identified. In one approach, a lazy hint resolution is performed to match unresolved table or block hints. In another approach, global hints are matched with destination query blocks based on query block names. For example, if a query block name is specified, the optimizer locates the query block with the specified name. Once the targeted query block is found, if a dotted path qualifier (table alias) is specified, the optimizer resolves the table hint by following a trail of tables in a FROM clause. If a matching query block or table is not found, then the hint may not be used by the optimizer.

After unresolved hints are matched with destination query blocks, target and conflict resolution are performed. Target resolution involves finding a hinted table or query block of a hint, and combining it with other hints. Hint precedence rules govern the resolution of two or more conflicting hints referencing the same object. The rules may be based on a relationship between the source query blocks of the hints.

Conflict Resolution

A query block directly contained in another query block is called a child of the containing query block. The block containing the child is called a parent. The children of a parent's child query block are also called children of the parent. Thus, a child query block is a descendant of a parent query block and the parent query block is an ancestor of its children query blocks. Query blocks without a parent-child relationship between them are called sibling query blocks. A hint precedence procedure may consider each query block as its own sibling. For example, a sub-query query block is a child of its containing query block. Two sub-query query blocks contained in the same query block are siblings, as are query blocks representing each branch of a UNION ALL query.

In one embodiment, hint precedence rules resolve conflicts between a parent query block and a child query block in favor of the parent. Each conflicting hint between sibling query blocks may be discarded. Non-conflicting hints may not be affected by query block relationships. Conflicting sibling hints may be resolved before conflicting parent-child hints. This prevents sibling rivalry from causing a child hint to be discarded. An example of hint precedence is the following:

```
SELECT
    e1.first_name, e1.last_name, j.job_id, sum(e2.salary) total_sal
FROM employees e1,
    (   SELECT     /*+                              */
        *
        FROM employees e3) e2,
    job_history j
WHERE   e1.employee_id = e2.manager_id
    AND e1.employee_id = j.employee_id
    AND e1.hire_date = j.start_date
    AND e1.salary = ( SELECT /*+                    */
            max (e2.salary)
            FROM (SELECT /*+ QB_NAME (QB4)
                    FULL (e4)   */
                FROM employees e4) e2
            WHERE e2.department_id = e1.department_id)
GROUP BY   e1.first_name, e1.last_name, j.job_id
ORDER BY   total_sal;
```

In this example, the conflicting sibling hints negate each other, leaving the child hint unchanged.

The global hints provide several new hints that can be used to tune a SQL statement. For example, a query block name hint can allow a user to provide a name for a hint. This name can be used in an outer query block to provide hints to tables appearing in the named query block. Also, negative hints, such as NO_QUERY_TRANSFORMATION, can be used to exclude parts of the execution plan search space from consideration by the optimizer. A USE_NL hint instructs the optimizer to use a nested loops join when the specified table occurs on the right side of the join.

Several enhancements may be made to existing hints based on global hints. For example, each single-table, multi-table, and query block hint can use the name of a query block to specify a location of the hint. The hint can then behave as if it were specified in the query block. A leading hint, which specifies the first table in the execution plan chosen by the optimizer, can specify a set of tables as the prefix of the execution plan.

The example below illustrates how several of the global hint formats can be used in a view and a query:

```
CREATE OR REPLACE VIEW V AS
SELECT
    e1.first_name, e1.last_name, j.job_id, sum(e2.salary) total_sal
FROM employees e1,
    (   SELECT*
        FROM employees e3) e2,
    job_history j
WHERE   e1.employee_id = e2.manager_id
    AND e1.employee_id = j.employee_id
    AND e1.hire_date = j.start_date
    AND e1.salary = ( SELECT   /*+   QB_NAME (QBLOCK) */
            max (e2.salary)
            FROM employees e2
            WHERE e2.department_id = e1.department_id)
GROUP BY   e1.first_name, e1.last_name, j.job_id
ORDER BY   total_sal;
SELECT   /*+ LEADING (V.e1      V.j)    */
            USE_NL_WITH_INDEX (V.j
            (employee_id start_date))
            NO_UNNEST (@QBLOCK)
            INDEX (@QBLOCK e2 (department_id)
            emp_emp_id_pk)
        */
    *
FROM V;
```

The sub-query is named QBLOCK using the QB_NAME hint. This sub-query is prevented from being unnested by the global NO_UNNEST hint. Two indexes on the table e2 in this sub-query are hinted: one with department_id as its column (i.e. the index emp_department_ix) and the index emp_emp_id_pk. In the view V, the tables e1 and j are fixed as the leading tables in the join order. Also, a nested loops join is used for j, only if the concatenated index jhist_emp_id_st_date_pk (index columns: (employee_id, start_date)) can be used with at least one join predicate on its columns.

Advantages

The algorithms used for naming query blocks and table aliases are guaranteed to generate unique and deterministic names. This gives global hints the ability to be stored persistently, associated with given SQL statements, and assure a DBA that the global hints using these names will still be applied to the correct targets through database or application upgrades.

Global hints need not be physically placed within the query block they target or even in the targeted SQL statement. Global hints can be stored persistently with appropriate mapping to a SQL statement. They can be created manually or by automatic SQL tuning. A global hint can target multiple SQL statements. For example, a global hint that specifies object statistics or predicate selectivities can be applicable to more than one SQL statement.

Figure 4:
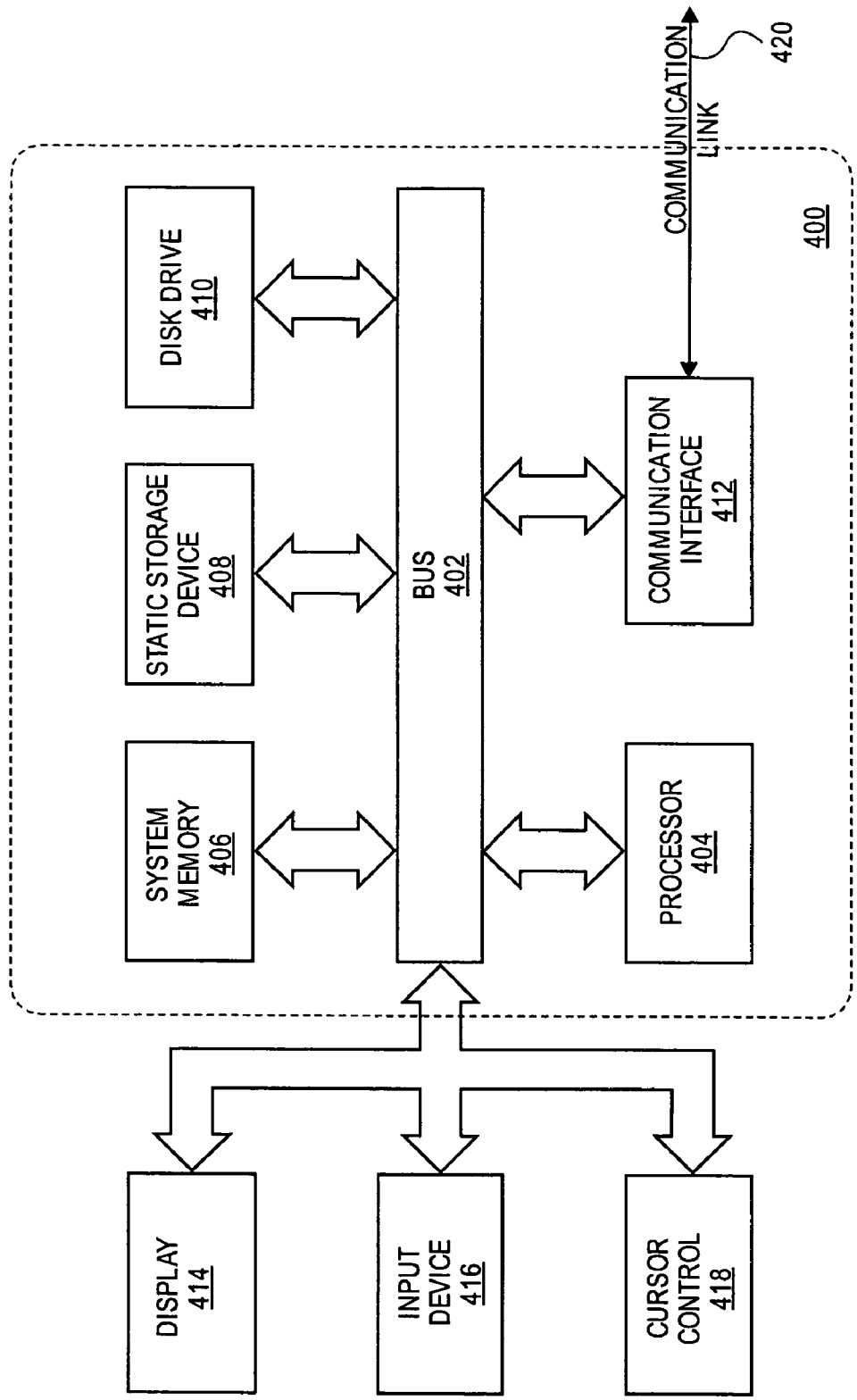
FIG. 4 is a block diagram of a computer system suitable for implementing an embodiment of global hints.

FIG. 4 is a block diagram of a computer system 400 suitable for implementing an embodiment of global hints. Computer system 400 includes a bus 402 or other communication mechanism for communicating information, which interconnects subsystems and devices, such as processor 404, system memory 406 (e.g., RAM), static storage device 408 (e.g., ROM), disk drive 410 (e.g., magnetic or optical), communication interface 412 (e.g., modem or ethernet card), display 414 (e.g., CRT or LCD), input device 416 (e.g., keyboard), and cursor control 418 (e.g., mouse or trackball).

According to one embodiment of the invention, computer system 400 performs specific operations by processor 404 executing one or more sequences of one or more instructions contained in system memory 406. Such instructions may be read into system memory 406 from another computer readable medium, such as static storage device 408 or disk drive 410. In alternative embodiments, hard-wired circuitry may be used in place of or in combination with software instructions to implement the invention.

The term "computer readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as disk drive 410. Volatile media includes dynamic memory, such as system memory 406. Transmission media includes coaxial cables, copper wire, and fiber optics, including wires that comprise bus 402. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 400. According to other embodiments of the invention, two or more computer systems 400 coupled by communication link 420 (e.g., LAN, PTSN, or wireless network) may perform the sequence of instructions to practice the invention in coordination with one another. Computer system 400 may transmit and receive messages, data, and instructions, including program, i.e., application code, through communication link 420 and communication interface 412. Received program code may be executed by processor 404 as it is received, and/or stored in disk drive 410, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

We claim:

1. A computer implemented method, comprising:
    associating a query language statement with a query profile;
    determining a query block for the query language statement, wherein
        the query block is a part of a rewritten query language statement for optimization and is generated or transformed from one or more other query blocks during compilation of the query language statement to become a part of the query language statement, and
        the act of determining the query block is performed by a processor;
    associating one or more tuning hints with the query block;
    resolving an unresolved hint in conflict with another tuning hint, wherein the unresolved hint is stored in a hint data structure on a tangible computer readable storage medium or a computer storage device; and
    storing the one or more tuning hints for the query block, wherein
        at least one of the one or more tuning hints associated with the query block is retrieved for and applied to the query block during the compilation of the query language statement, and
        the part of the rewritten query language statement is not the entire rewritten query language statement.

2. The method of claim 1, further comprising:
    transforming the query block from a parent block into a child block during compilation of the statement.

3. The method of claim 2, further comprising:
    determining a name for the child block based on a transformation applied to the parent block and a name of the parent block.

4. The method of claim 3, further comprising:
    associating one or more tuning actions with the child block using the name of the child block.

5. The method of claim 1, further comprising:
    associating the one or more tuning hints with a plurality of query language statements.

6. The method of claim 5, further comprising:
    determining a name for each query block of each statement; and
    associating the one or more tuning hints with one or more query blocks using the query block names.

7. The method of claim 1, wherein the query language statement is a SQL statement.

8. An apparatus, comprising:
at least a processor configured for performing:
associating a query language statement with a query profile;
determining a query block for a query language statement, wherein
the query block is a part of a rewritten query language statement for optimization and is generated or transformed from one or more other query blocks during compilation of the query language statement to become a part of the query language statement;
associating one or more tuning hints with the query block;
storing the one or more tuning hints for the query block, wherein at least one of the one or more tuning hints associated with the query block is retrieved for and applied to the query block during the compilation of the query language statement;
resolving an unresolved hint in conflict with another tuning hint, wherein;
the part of the rewritten query language statement is not the entire rewritten query language statement; and
a computer readable storage medium or a computer readable storage device configured for storing the unresolved hint in a hint data structure.

9. The apparatus of claim 8, in which the processor is further configured for performing:
transforming the query block from a parent block into a child block during compilation of the statement.

10. The apparatus of claim 9, in which the processor is further configured for performing:
determining a name for the child block based on a transformation applied to the parent block and a name of the parent block.

11. The apparatus of claim 10, in which the processor is further configured for performing:
associating one or more tuning actions with the child block using the name of the child block.

12. The apparatus of claim 8, in which the processor is further configured for performing:
associating the one or more tuning hints with a plurality of query language statements.

13. The apparatus of claim 12, in which the processor is further configured for performing:
determining a name for each query block of each statement; and
associating the one or more tuning hints with one or more query blocks using the query block names.

14. The apparatus of claim 8, wherein the query language statement is a SQL statement.

15. A volatile or non-volatile computer readable medium storing a computer program of instructions which, when executed by a processing system, cause the system to perform a method comprising:
associating a query language statement with a query profile;
determining a query block for the query language statement, wherein
the query block is a part of a rewritten query language statement for optimization and is generated or transformed from one or more other query blocks during compilation of the query language statement to become a part of the query language statement;
associating one or more tuning hints with the query block;
resolving an unresolved hint in conflict with another tuning hint, wherein the unresolved hint is stored in a hint data structure; and
storing the one or more tuning hints for the query block, wherein
at least one of the one or more tuning hints associated with the query block is retrieved for and applied to the query block during the compilation of the query language statement, and
the part of the rewritten query language statement is not the entire rewritten query language statement.

16. The medium of claim 15, wherein the computer program, when executed, further performs the method comprising:
transforming the query block from a parent block into a child block during compilation of the statement.

17. The medium of claim 16, wherein the computer program, when executed, further performs the method comprising:
determining a name for the child block based on a transformation applied to the parent block and a name of the parent block.

18. The medium of claim 17, wherein the computer program, when executed, further performs the method comprising:
associating one or more tuning actions with the child block using the name of the child block.

19. The medium of claim 18, wherein the computer program, when executed, further performs the method comprising:
determining a name for each query block of each statement; and
associating the one or more tuning hints with one or more query blocks using the query block names.

20. The medium of claim 15, wherein the computer program, when executed, further performs the method comprising:
associating the one or more tuning hints with a plurality of query language statements.

21. The medium of claim 15, wherein the query language statement is a SQL statement.

22. A computer system comprising:
at least a processor configured for performing;
associating a query language statement with a query profile;
determining a query block for the query language statement, wherein
the query block is a part of a rewritten query language statement for optimization and is generated or transformed from one or more other query blocks during compilation of the query language statement to become a part of the query language statement;
associating one or more tuning hints with the query block;
resolving an unresolved hint in conflict with another tuning hint, wherein the unresolved hint is stored in a hint data structure on a tangible computer readable storage medium or a computer storage device; and
a tangible computer readable storage medium or a computer readable storage device configured for:
storing the one or more tuning hints for the query block, wherein at least one of the one or more tuning hints associated with the query block is retrieved for and applied to the query block during the compilation of the query language statement.

23. The computer system of claim 22 in which the processor is further configured for:
  transforming the query block from a parent block into a child block during compilation of the statement.

24. The computer system of claim 23 in which the processor is further configured for:
  determining a name for the child block based on a transformation applied to the parent block and a name of the parent block.

25. The computer system of claim 24 in which the processor is further configured for:

associating one or more tuning actions with the child block using the name of the child block.

* * * * *